United States Patent
Karman

(10) Patent No.: US 7,015,993 B2
(45) Date of Patent: Mar. 21, 2006

(54) REFLECTIVE COLOR FILTER AND DISPLAY DEVICE INCLUDING THE SAME

(75) Inventor: Gerardus Petrus Karman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 87 days.

(21) Appl. No.: 10/914,438

(22) Filed: Aug. 9, 2004

(65) Prior Publication Data

US 2005/0012882 A1 Jan. 20, 2005

Related U.S. Application Data

(63) Continuation of application No. 10/150,801, filed on May 17, 2002, now Pat. No. 6,800,350, and a continuation of application No. 10/095,549, filed on Mar. 12, 2002, now Pat. No. 6,812,980.

(30) Foreign Application Priority Data

Mar. 16, 2001 (EP) .......................................... 01200987

(51) Int. Cl.
*G02F 1/1335* (2006.01)

(52) U.S. Cl. ....................................... 349/106; 349/104
(58) Field of Classification Search ................. 349/104, 349/106, 115, 129
See application file for complete search history.

(56) References Cited

FOREIGN PATENT DOCUMENTS

| EP | 0373822 A2 | 6/1990 |
|---|---|---|
| EP | 0860718 A2 | 8/1998 |
| WO | WO0033129 | 6/2000 |
| WO | WO0034808 | 6/2000 |

*Primary Examiner*—Dung T. Nguyen
*Assistant Examiner*—Richard H Kim

(57) ABSTRACT

A reflective color filter includes: a first domain reflecting visible red colored light at substantially normal angles of incidence; a second domain reflecting invisible infrared colored light at substantially normal angles of incidence and reflecting red colored light at an oblique angle of incidence, greater than zero degrees; a third domain reflecting green red colored light at substantially normal angles of incidence; and a fourth domain reflecting blue colored light at substantially normal angles of incidence. In one configuration, the second domain overlies or underlies the first domain, but not the third or fourth domains. The reflective color filter can be used in a color liquid crystal display device.

15 Claims, 3 Drawing Sheets

REFLECTIVE COLOR FILTER AND DISPLAY DEVICE INCLUDING THE SAME

CROSS REFERENCE TO RELATED APPLICATIONS

Figure 1:
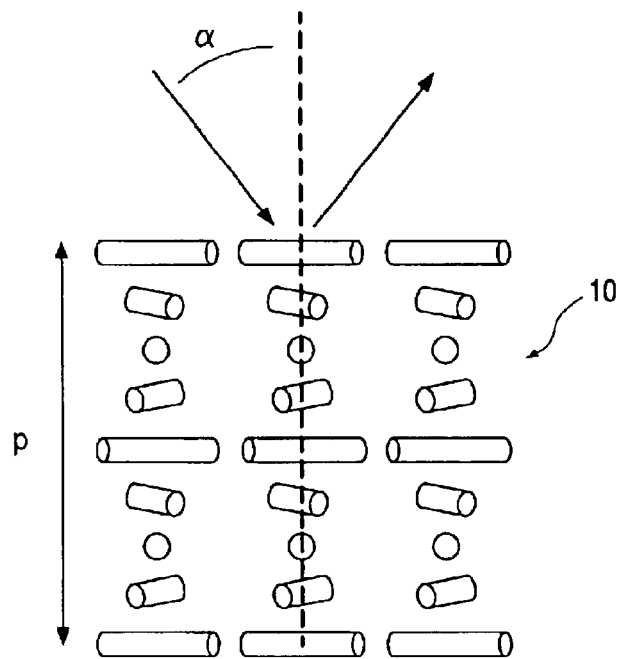

This application is a continuation of U.S. patent application Ser. No. 10/150,801, filed on 17 May 2002 now U.S. Pat. No. 6,800,350 and is a continuation of application Ser. No. 10/095,549, filed Mar. 12, 2002, now U.S. Pat. No. 6,812,980.

The present invention relates to reflective colour filters, and more particularly to cholesteric filters for use in connection with displays devices. The invention also relates to a display device utilising such filters.

Cholesteric materials, also known as chiral nematic materials, can be used as reflective colour filters. One advantage of such filters is that they do not absorb any light, in contrast to conventional absorbing colour filters. Thus, a higher filtering efficiency may be achieved when using cholesteric filters rather than conventional, absorbing colour filters. Furthermore, manufacturing of cholesteric colour filters is less complicated than manufacturing of absorbing colour filters, in the respect that fewer processing steps are typically needed. However, the colour reflected from cholesteric colour filters is strongly dependent on the viewing angle (i.e. the angle of incidence on the filter). The angular acceptance bandwidth of display devices of the reflective type based on cholesteric liquid crystals is typically around ±20°, at most.

A layer of cholesteric material ordered in a planar state (principal axis perpendicular to the surface of the filter layer) acts as an interference film that reflects light of a wavelength matching the pitch of the cholesteric structure. Light not meeting the interference criterion is transmitted through the material. Thus, in order to reflect one specific wavelength, the cholesteric material must have a pitch matching that specific wavelength.

When the angle of incidence is greater than zero, i.e. at an oblique angle of incidence, the effective pitch of the cholesteric material is changed. By consequence, the colour reflected is altered accordingly by the angle of incidence, as mentioned above. The wavelength $\lambda_{max}$ for which maximum reflection occurs is given by:

$$\lambda_{max} = n_{avg} \, p \, \cos(\alpha),$$

where $n_{avg}$ is the average refractive index of the material, p is the pitch of the cholesteric structure and $\alpha$ is the angle of incidence with respect to the layer normal. It should be noted that, in the above equation, refraction at the layer surface between the cholesteric material and the ambient is neglected.

Clearly, as the angle of incidence increases, the wavelength of the light reflected decreases. In other words, when a cholesteric filter is viewed under increasing angles, the wavelength of reflected light decreases. For display devices, this angle dependency is very disturbing. For the red component of a multi-colour display, this is particularly annoying, since the colour turns yellow or green. In the context, it should be noted that the human eye is most sensitive for green light. Therefore, the change from red towards green becomes more apparent when a colour display based on cholesteric filters is viewed under an oblique angle. Also, the reproduction of red colour is deteriorated, leading to a loss of colour space.

One previously proposed solution to overcome the above-described problem is to introduce an absorbing filter, which absorbs the unwanted colours. However, such an approach to the problem has several limitations. Firstly, it reintroduces the absorbing colour filters. As mentioned above, one advantage of using reflective filters (such as cholesteric filters) is the possibility of avoiding the expensive and complicated absorbing filters. Secondly, an absorbing filter will influence other colours as well, thereby skewing the colour reproduction. A cholesteric filter layer comprising absorbing dyes which absorb unwanted colours is disclosed in WO 00/33129.

Hence, in the art of reflective, cholesteric colour filters, there is a need for improvements regarding the colour reproduction at oblique viewing angles.

It is a general object of the present invention to provide a solution to the above-described problems regarding the colour shift of cholesteric filters when viewed under oblique angles. This object is achieved by a device and a method of the kind presented in the appended claims.

Hence, the present invention provides a reflective filter structure arranged to reproduce colour by reflection, said structure comprising a first domain adapted to reflect, at normal angle of incidence, light having a red colour, said filter structure being characterised by further comprising a second domain adapted to reflect, at normal angle of incidence, light having an infrared colour, wherein said second domain is further adapted to reflect, at a predetermined angle of incidence greater than zero, light having a red colour.

In particular, it is an object of the present invention to increase the acceptable viewing angle of colour display devices based on reflective filters comprising a material having a cholesteric order.

Thus, it is an object of the present invention to provide a reflective colour filter based on cholesterically ordered liquid crystals, which filter exhibits an enhanced colour reproduction at oblique viewing angles without the need to incorporate absorbing elements. Nevertheless, it can be advantageous to combine the features of the present invention with absorbing elements or dyes in order to achieve particular, desired effects.

The present invention is based on the recognition that the addition of an infrared domain to a conventional RGB pattern of a matrix display can be used for the reproduction of red colour when the display is viewed under oblique angles. The infrared domain is adapted to reflect, when viewed under a normal angle of incidence, light within the infrared range of the colour spectrum. Thus, under a normal (i.e. perpendicular) viewing angle, the infrared domain is invisible to the human eye. However, when viewed under an oblique angle, the wavelength of light reflected from the infrared domain is shifted towards shorter wavelengths. Consequently, the colour reproduction from the infrared domain can be arranged to fall within the red range of the colour spectrum when said domain is viewed under an oblique angle. By virtue of the infrared domain becoming visible red when viewed under oblique angles, the defective yellow or green colour is compensated.

Although the invention is described by means of examples employing cholesteric liquid crystals, it is to be understood that other types of reflective colour filters are possible within the scope of the invention.

One advantage of the reflective filter structure according to the present invention is that the additional infrared domain can be manufactured with existing technology. The colour reflected by a cholesteric film is determined by the pitch of said film. Thus, an infrared domain could easily be incorporated in a matrix display by providing a domain of cholesteric material having a pitch that is different from the pitch of the red, green and blue domains, for example. The present invention gives important enhancement to reflective colour filters without introducing new and complicated processing steps.

Advantageously, the infrared domain is formed in a layer that is common to all domains, i.e. the domains are formed side by side in a single layer. Alternatively, the infrared domain is formed in a second layer on top of the layer comprising the red, green and blue domains. In the latter case, the infrared domain is formed solely on top of the red domain, leaving the green and blue domains uncovered. Similarly, the infrared domain can also be formed in a second layer underneath the red domain.

It should be noted that the terms "infrared", "red", "green" and "blue" domains refer to the colours reflected at a normal (i.e. perpendicular) viewing angle. However, the fact being appreciated that the reflected colour shifts to shorter wavelengths as the viewing angle increases.

In one aspect, the present invention provides a reflecting filter structure of cholesteric material, wherein the reproduction of red colour is augmented for oblique viewing angles. To this end, a reflective filter structure comprises both a red domain and an infrared domain. At zero angle of incidence (i.e. under normal viewing angle), the red domain reflects light of red colour, and the infrared domain reflects light of infrared colour. At an oblique angle of incidence, the infrared domain reflects light of red colour, while the red domain reflects light of yellowish-green colour. As an example only, the infrared domain can be adapted to reflect light within the red range of the colour spectrum when the filter is viewed at an angle of 45°. Thus, the reproduction of red colour is enhanced at an oblique viewing angle by the presence of the infrared domain.

In another aspect, the present invention provides a pixel structure for full colour reproduction, the pixel structure comprising a blue domain, a green domain, a red domain and an infrared domain. Preferably, the area of each domain is carefully selected in order to reproduce the best possible colour space. Different selections of domain sizes and domain layout will be further described in the following detailed description of some preferred embodiments of the present invention.

Manufacturing of patterned layers of cholesteric material is known in the art. For example, WO 00/34808 discloses a method of manufacturing a patterned layer of a polymer material having a cholesteric order, in which the material is oriented is such a way that the axis of the molecular helix of the cholesterically ordered material extends transversely to the layer.

Figure 2:
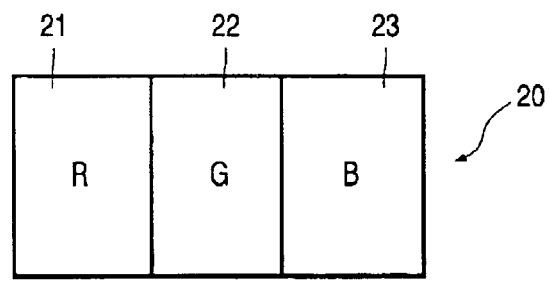
Figure 3:
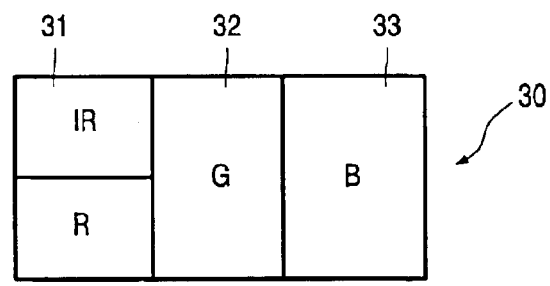
Figure 4:
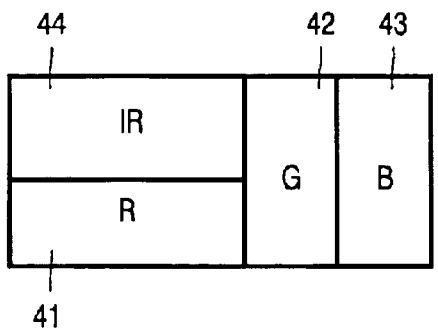
Figure 5:
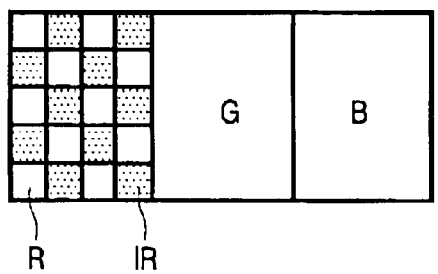
Figure 6:
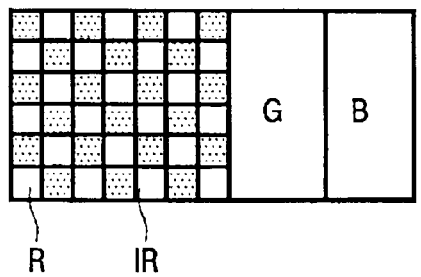
Figure 7:
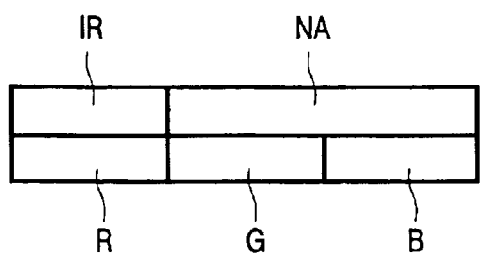

Further features and objects of the present invention will be appreciated when the following detailed description of some preferred embodiments thereof is read and understood. In the detailed description, reference is made to the accompanying drawings, on which:

FIG. 1 schematically shows a prior art filter layer of cholesterically ordered material;

FIG. 2 schematically shows a reflective filter structure according to the prior art;

FIG. 3 schematically shows a first embodiment of the present invention;

FIG. 4 schematically shows a second embodiment of the present invention;

FIG. 5 schematically shows a third embodiment of the present invention;

FIG. 6 schematically shows a fourth embodiment of the present invention;

FIG. 7 schematically shows a fifth embodiment of the present invention; and

Figure 8:
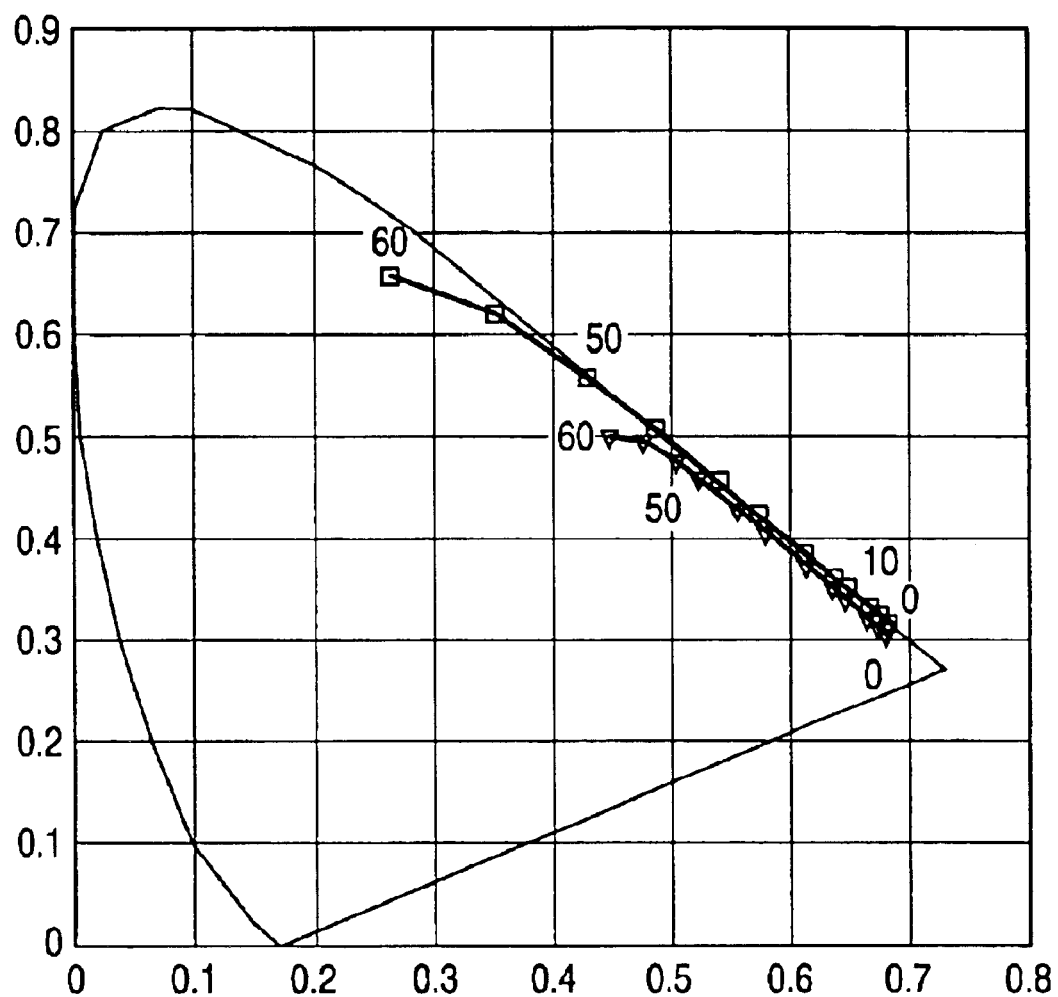

FIG. 8 shows a plot of colour reproduction by reflective filters according to both prior art and to the present invention.

By way of introduction, the improvements of reflective colour filters achieved by the present invention will be described by way of an illustrative example. A layer of chiral nematic liquid crystals 10 (i.e. a cholesteric material) is schematically shown in FIG. 1.

Consider a reflective colour filter having a first domain of cholesteric material adapted to reflect, at normal angle of incidence, light having a red colour. The wavelength of light perceived as red colour is in the range from 600 nm to 700 nm, typically around 650 nm. The pitch p of the cholesteric material required for reflecting light of the centre wavelength $\lambda$ at normal incidence ($\alpha=0$) in a material of average refractive index $n_{avg}$ is given by $p=\lambda/n_{avg}$. For non-zero angles of incidence, the wavelength of reflected light is shifted towards shorter wavelengths (i.e. the wavelength of peak reflectivity is shifted towards shorter wavelengths). If refraction at the interface between the cholesteric layer and the ambient (here assumed to be air having a refractive index of one) is accounted for, the centre wavelength reflected at an angle of incidence $\alpha$ is given by $$\lambda(\alpha)=\lambda_0 \cos[\sin^{-1}(n_{avg}^{-1}\sin(\alpha))],$$

where $\lambda_0$ is the wavelength reflected at zero angle of incidence and $n_{avg}$ is the average refractive index of the cholesteric material.

If said first domain of cholesteric material is adapted to reflect light having a wavelength of 650 nm at normal angle of incidence, the wavelength for which maximum reflection occurs at an oblique angle of $\alpha$ is given by the equation above. For example, at a viewing angle of 45° and an average refractive index $n_{avg}=1.5$, the reflected light will be centred around 573 nm (which is yellow).

Now, by juxtaposing, in the same layer, said first domain with a second domain of cholesteric material that is adapted to reflect, at normal angle of incidence, light in the infrared region of the spectrum, the reproduction of red colour at oblique angles is greatly enhanced. If the second domain is adapted to reflect light having a wavelength of about 740 nm at normal angle of incidence, the reflected light at 45° angle of incidence will be centred around 650 nm. Consequently, the loss of reflection at 650 nm from the first domain is compensated by reflection at 650 nm from the second domain. Hence, the perceived colour is a mixture between red and yellow, rather than pure yellow. Preferably, the sizes of the first and the second domain, as well as the separation there between, are small enough for the two domains not to be resolved by the unaided human eye.

Alternatively, the infrared domain can be formed on top of the red domain, in an additional layer. In this case, the infrared domain is provided solely on top of the red domain, leaving the green and blue domains uncovered. Similarly, the infrared domain can also be arranged underneath the red domain in a straightforward way.

It is envisioned that the present invention will have its primary field of use in colour display devices, such as RGB matrix displays. A prior art structure of an RGB display is illustrated in FIG. 2. Any pixel 20 in the display comprises three sub-pixels: a red sub-pixel 21, a green sub-pixel 22 and a blue sub-pixel 23. Each sub-pixel 21, 22, 23 is comprised of a domain of cholesteric material adapted to reflect, at normal angle of incidence, a predetermined wavelength of light, i.e. red, green and blue light, respectively. In order to provide an updateable pixel, the reflectivity of the cholesteric material can be switched on and off, or adjusted, electrically.

However, as mentioned above, the angle of acceptance for a decent colour reproduction is only about ±20°.

According to the present invention, increased viewing angles are achieved by introducing into the pixel also an additional sub-pixel that is adapted to reflect, at normal angle of incidence, light having an infrared colour. Consequently, at oblique viewing angles, the reflection from this additional sub-pixel will shift towards visible red.

In FIG. 3, a plan view of a first preferred embodiment of the present invention is shown. In this case, the conventional red domain is divided into one red domain 31 and one infrared domain 34. The shown embodiment is probably the most straightforward to manufacture, with a minimum of alterations of the process. However, the reproduction of (the brightness or reflection coefficient for) red colour is lower than the reproduction of green and blue, since the surface areas of the red 31 and the infrared 34 domain, respectively, are smaller than the surface areas of the green 32 and blue 33 domains. In some cases, this might be acceptable or even desirable. In other cases, however, it may be necessary to take measures in order to avoid the difference in colour brightness, such as the examples presented below.

In FIG. 4, a plan view of a second preferred embodiment of the present invention is shown. Here, the intensity of red, blue and green light is balanced by each of the infrared 44, the red 41, the green 42 and the blue 43 domains having substantially equal surface areas. As the viewing angle increases, and as the reflection of red light from the red domain 41 decreases, the reflection of visible red from the infrared domain 44 increases accordingly. It is to be understood that the area of each domain 41, 42, 43, 44 can be designed so that the desired colour brightness is achieved.

FIG. 5 schematically shows a plan view a third preferred embodiment of the present invention. In this embodiment, the red R and the infrared IR domains are interspersed in a checkerboard structure. The checkerboard structure enhances the mixture of the light reflected from the red domain and the light reflected from the infrared domain.

In FIG. 6, a plan view of a fourth embodiment of the present invention is shown. This embodiment is similar to that shown in FIG. 5. However, in order to further enhance the reproduction of red colour, the checkerboard structure of the red R and infrared IR reflective domains is larger than in the previous embodiment. By choosing the surface areas of each domain (infrared, red, green and blue) appropriately, the reproduction of red colour can be balanced to the reproduction of green and blue colour.

FIG. 7 schematically shows a side view of an embodiment of the present invention, in which an infrared IR domain is arranged in a second layer on top of the layer comprising the red R, green G and blue B domains. The infrared IR domain is provided only over the red R domain, effectively leaving the green and blue domains uncovered. For practical reasons, also the green and blue domains may be covered, but with a non-active NA domain that is essentially non-reflecting. It is to be understood that the effect of the infrared IR domain on the colour reproduction of the green G and blue B domains should be avoided to the greatest possible extent.

Although the infrared domain is shown to be provided on top of the red domain in FIG. 7, it is also possible to have the infrared domain underneath the red domain.

The improved colour reproduction at increasing viewing angles achieved by the present invention is illustrated in FIG. 8. The figure shows, in a colour triangle plot, the colour reproduction of a single domain red filter (squares), and a dual-domain, red and infrared filter (triangles). In the colour triangle, the right corner corresponds to red colour, the upper corner to green colour and the lower/left corner to blue colour. The red domain had a 100 nm wide reflection band centred at 650 nm, and the infrared domain had a 100 nm wide reflection band centred at 750 nm. In the dual-domain filter, the surface area of the red domain was equal to the surface area of the infrared domain. The colour of the reflected light is plotted for viewing angles in air (outside of the colour filter) ranging from zero angle of incidence to 60° angle of incidence, in steps of 5°. The figure clearly illustrates that the reproduction of red colour is greatly enhanced when a dual-domain filter according to the present invention is utilised.

Hence, by including an infrared domain according to the present invention, i.e. a reflective filter layer domain reflecting light within the infrared range of the spectrum when viewed from zero angle of incidence and reflecting visible red when viewed from an oblique angle of incidence, in a reflective colour filter based on chirally nematic (cholesteric) liquid crystals, the colour reproduction at oblique angles is considerably enhanced.

What is claimed is:

1. A reflective color filter, comprising:
    a first domain adapted to reflect, at substantially normal angles of incidence, visible red colored light;
    a second domain adapted to reflect, at substantially normal angles of incidence, infrared light and to reflect, at an oblique angle of incidence greater than zero degrees, visible red colored light;
    a third domain adapted to reflect, at substantially normal angles of incidence, green colored light; and
    a fourth domain adapted to reflect, at substantially normal angles of incidence, blue colored light,
        wherein the second domain is stacked with the first domain such that the first and second domains are on different layers, and
        wherein the second domain is not stacked with the third domain and is also not stacked with the fourth domain.

2. The filter of claim 1, wherein the third and fourth domains are on a same layer with each other and with one of the first and second domains.

3. The filter of claim 1, wherein at least one of the domains comprises a cholesteric material.

4. The filter of claim 1, wherein a reflective surface area of each domain is substantially equal.

5. The filter of claim 1, further comprising a non-reflecting domain that is stacked with the third domain such that the non-reflecting domain and the third domain are on different layers.

6. A liquid crystal display device, comprising:
    a first domain adapted to reflect, at substantially normal angles of incidence, visible red colored light;
    a second domain adapted to reflect, at substantially normal angles of incidence, infrared light and to reflect, at an oblique angle of incidence greater than zero degrees, visible red colored light;
    a third domain adapted to reflect, at substantially normal angles of incidence, green colored light; and
    a fourth domain adapted to reflect, at substantially normal angles of incidence, blue colored light,
        wherein the second domain is stacked with the first domain such that the first and second domains are on different layers, and wherein the second domain is not stacked with the third domain and is also not stacked with the fourth domain.

7. The liquid crystal display device of claim 6, wherein the third and fourth domains are on a same layer with each other and with one of the first and second domains.

8. The liquid crystal display device of claim 6, wherein at least one of the domains comprises a cholesteric material.

9. The liquid crystal display device of claim 6, wherein a reflective surface area of each domain is substantially equal.

10. The liquid crystal display device of claim 6, further comprising a non-reflecting domain that is stacked with the third domain such that the non-reflecting domain and the third domain are on different layers.

11. A liquid crystal display device, comprising:
   a first domain adapted to reflect, at substantially normal angles of incidence, visible red colored light;
   a second domain adapted to reflect, at substantially normal angles of incidence, infrared light and to reflect, at an oblique angle of incidence greater than zero degrees, visible red colored light;
   a third domain adapted to reflect, at substantially normal angles of incidence, green colored light; and
   a fourth domain adapted to reflect, at substantially normal angles of incidence, blue colored light,
      wherein the second domain is formed side by side with the first domain in a single layer.

12. The liquid crystal display device of claim 11, wherein at least one of the domains comprises a cholesteric material.

13. The liquid crystal display device of claim 11, wherein a reflective surface area of each domain is substantially equal.

14. The liquid crystal display device of claim 11, wherein the first domain is interspersed with the second domain in a checkerboard pattern.

15. The liquid crystal display device of claim 11, wherein a reflective surface area of the first domain is substantially equal to a reflective surface area of the second domain.

* * * * *